United States Patent [19]

Cibulak

[11] Patent Number: 4,763,579
[45] Date of Patent: Aug. 16, 1988

[54] MODULAR SHELVING SYSTEM

[76] Inventor: Albert A. Cibulak, 4165 Fieldgate Drive, Unit 98, Mississauga, Ontario L4W 2M9, Canada

[21] Appl. No.: 7,996

[22] Filed: Jan. 29, 1987

[30] Foreign Application Priority Data

Jun. 19, 1986 [CA] Canada .................. 511922

[51] Int. Cl.⁴ ............................. A47B 47/00
[52] U.S. Cl. ........................ 108/48; 108/59; 108/152; 312/238; 312/245; 403/294; 403/318; 403/341
[58] Field of Search ............ 403/293, 294, 316, 318, 403/341; 312/238, 245, 246; 211/90, 94, 187; 108/59, 144, 108, 111, 152, 48

[56] References Cited

U.S. PATENT DOCUMENTS

| | | | |
|---|---|---|---|
| 1,325,143 | 12/1919 | Conterio | 108/152 X |
| 3,401,652 | 9/1968 | Thor | 312/245 X |
| 3,612,633 | 10/1971 | Bloom | 312/245 |
| 3,664,274 | 5/1972 | Bustos | 108/144 |
| 3,946,979 | 3/1976 | Ehlenbracht et al. | 312/245 X |
| 3,961,586 | 6/1976 | Bernard | 108/111 |
| 4,158,336 | 6/1979 | Brescia et al. | 108/111 |
| 4,195,577 | 4/1980 | Gross | 211/90 X |
| 4,283,099 | 8/1981 | Burton | 312/245 X |

FOREIGN PATENT DOCUMENTS

| | | | |
|---|---|---|---|
| 472979 | 3/1929 | Fed. Rep. of Germany | 108/111 |
| 9572 | of 1911 | United Kingdom | 108/144 |

Primary Examiner—Kenneth J. Dorner
Assistant Examiner—James R. Brittain
Attorney, Agent, or Firm—Watson, Cole, Grindle & Watson

[57] ABSTRACT

There is provided a shelving system for use in storage compartments, which shelving system utilizes slidable horizontally extending bracing members which by creating a static frictional force between the shelf and the compartment walls holds the shelf in place and for heavy loads, the same shelving system which utilizes slidable horizontally extending bracing members engaging with vertical columnar members whereby free access is provided to the shelves with elimination of any outboard columnar members or legs.

7 Claims, 7 Drawing Sheets

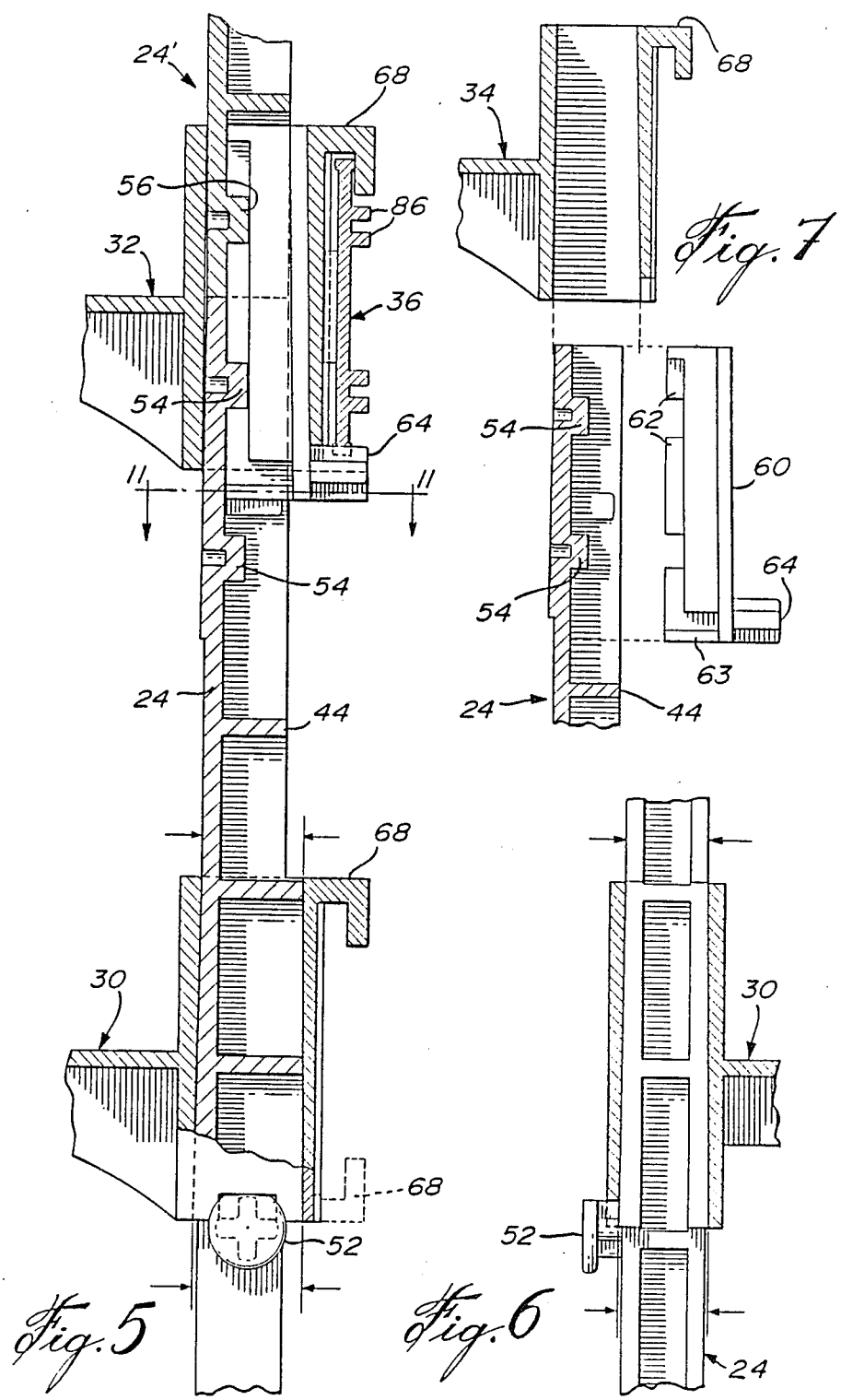

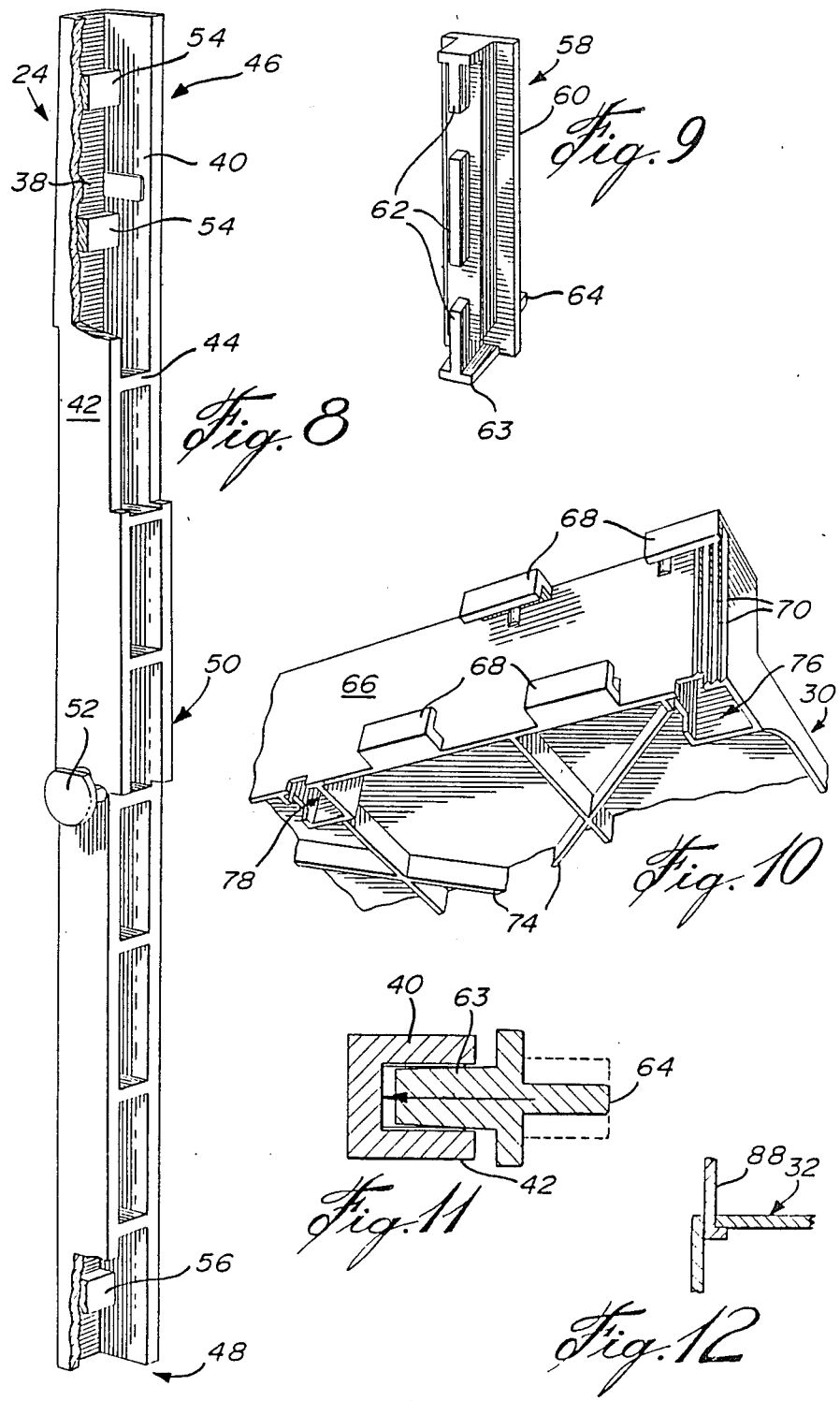

MODULAR SHELVING SYSTEM

The present invention relates to a shelving system and more particularly to a shelving system kit suitable for use with storage compartments.

Storage compartments are normally rectangularly shaped, upright containers with a hinged door on one side to allow access. They are generally made of steel or wood and have rear, side, top and bottom walls. Some types of storage compartments are commonly referred to as lockers; the size of normal commercially available lockers are of a width 10" to 18"; a depth of 12 to 18"; and a height of from 12 to 72". Various configurations of groups of lockers are common with some types of arrangements being: 6 lockers, 12" high, within a 72" high structure; 3 lockers, 24" high, within a 72" structure; 2 lockers, 36" high within a 72" structure or 1 locker, 72" high. It is normally only the latter configuration which has an interior shelf positioned near the top. No shelving is provided in the smaller sized lockers.

Lockers are frequently installed and owned by an establishment and either provided free of charge or rented to the users of the establishment. The locker users normally secure their personal belongings in the locker with a locking device on the hinged outer door. The space provided within a locker is very limited with the storage of personal effects being constrained by the limited space.

In schools where lockers are provided to students, the various articles used by students such as books, paper, pens, erasers etc. as well as articles of clothing and other personal effects are kept in the locker. At places of work, the users store a variety of personal effects and items related to their employment. At recreational facilities the locker users store a variety of toiletry items, personal effects and recreational equipment such as racquets and balls, etc. Since the space is limited within the lockers and since there is insufficient or no shelving provided, the items stored in the lockers are placed on the floor of the locker in a cluttered disarray. It therefore becomes difficult to protect fragile items, such as eyeglasses, from damage, and protect papers or other personal items from being soiled by shoes and boots or from being crumpled or wrinkled. It also becomes time consuming to selectively search for a personal item which is not within view and may be anywhere within the pile of articles on the floor of the locker.

It is therefore desirable to provide a shelving unit which will hold personal items and help organize them in a fashion which reduces the possibility of damage or soiling and also make items clearly visible for fast and efficient retrieval. It is also desirable that the shelving unit not overwhelm the limited space but rather make better use of the limited space available.

Since the sizes of lockers vary it is also desirable that the shelving units fit securely within a range of locker sizes. The users of lockers have their own personal preference as to the type of articles stored, the number of items stored and placement of items within the locker. It is desirable therefore to have a shelving unit which provides flexibility as to the number of shelves a user wishes to install and the position of the shelves within a locker.

Also, since the door aperture to a locker is normally smaller than the interior space, a conventional shelf structure is limited to a size smaller than the door aperture. It is desirable to limit the capacity of a shelf structure to the interior dimensions rather than the dimensions of the door aperture. It is therefore desirable to have a shelf structure which can be completely assembled within the locker compartment or can be oriented in such a manner as to pass through the door aperture, yet in its correct orientation be wider than the door aperture.

Storage compartments such as closets found in home and industrial applications, also utilize shelving systems. Since brooms, mops, etc. are about 60" long, a compartment must provide a continuous open space the length of the mop and conventional shelving can therefore not effectively be used.

In both home and industrial applications, storage space in corners is not effectively used. Conventional four-leg shelving, if placed in a corner, restricts the access to the shelf since stored items must be guided around the outboard leg. Three-leg shelf systems normally rely on support from a ceiling structure and the floor. Cantilevered shelves require very sturdy fasteners in the wall structure to hold them up. It would therefore be desirable to provide a shelf system which does not use legs or does not use an outboard leg, does not require sturdy fasteners to hold the unit in place and does not rely on a ceiling structure or floor structure for support.

It is an object of the present invention to provide such a system. It is also an object of the present invention to provide a shelving system wherein the number of components is minimized and maximum flexibility of use is maintained.

According to one aspect of the invention, there is provided a shelving system suitable for use in the corner of a storage compartment which has a generally rectangular configuration, the system including at least one vertical member extending upwardly from a base of the storage compartment and supported by the vertically extending member, and at least one storage shelf, the storage shelf being engaged and supported by the vertically extending member, and at least a pair of horizontally extending members, each of the horizontally extending members extending along one of a pair of adjacent walls, one end of each horizontal member being in a locking relationship with the vertical member or shelf and the other end abutting a further adjacent wall, the horizontal member being in a state of compression to thereby provide support to the vertically extending member.

According to a second aspect of the invention, there is provided a shelving system suitable for the same use as described, the system including at least one storage shelf, the storage shelf being engaged and supported by at least one pair of horizontally extending members, each of the horizontally extending members extending along one of a pair of adjacent walls, one end of each horizontal member being in a locking relationship with the storage shelf and the other end abutting a further adjacent wall, the horizontal member being in a state of compression to thereby force the storage shelf against the adjacent wall with sufficient force so that the static friction between the storage shelf and the adjacent wall holds the storage shelf in place suspended above the floor thereby eliminating the need for vertical supports.

In greater detail the shelving system is designed to economize on the limited space available. This economy is accomplished in a variety of ways. The structural support of the units in the vertical direction is accomplished by the static frictional resistance between the shelf and the adjacent walls. The invention uses adjustable horizontal bracing members which push the unit into one of the rear corners of the compartment. With the horizontal members pushing against the adjacent vertical walls or stops and the structure or shelf pushed against the vertical walls which meet at the rear corner, the static friction between the walls and the shelf structure is sufficient to hold the shelf in place. Thus there is no need for vertical supports, contact with the ceiling structure or fasteners into the wall of the compartment which would normally be necessary to provide vertical support.

When loading of the shelf structure will be greater than the static frictional force holding the shelf in place, the structural support of the units in the vertical direction is increased by one or more vertical columnar members. To compensate for the inherent instability in the horizontal plane which such a structure would have, the invention again uses adjustable horizontal bracing members which push the unit into one of the rear corners of the compartment. With the Horizontal members contacting adjacent vertical walls or stops and the structure pushed against the vertical walls which meet at the rear corner, horizontal instability is eliminated. Thus, there is no requirement for additional vertical supports, contact with the ceiling structre or sturdy fasteners into the wall of the compartment which would normally be necessary to provide horizontal stability and vertical support. Since it is desirable that a clear and unobstructed space be provided above the floor, a conventional structure would require a leg which would interfere with access to the lower floor of the compartment. The shelving system of the present invention provides clear access to the lower floor. The invention also provides for clear access to all other shelves in the construction. The invention also provides a clear space along the side of the compartment running the complete length of the compartment.

In a preferred embodiment, additional space is economized by the 'L' shape of the shelves. These shelves are specifically designed to cantilever from the vertical columnar member(s) and/or the horizontal sliding members and penetrate only partially into the interior space of the compartment. They also run along the vertical walls matching the 90° corner of the compartment. Several 'L' shaped shelves can be placed in a compartment yet keeping the interior space open so that gym bags or carry bags, brooms, etc., can also be easily placed into the compartment.

To reduce the chance of damage to personal effects the invention also provides separate compartments along the 'L' shaped shelves. The compartments are provided with upright flanges so that items cannot slide off the shelves.

The vertically extending columnar members, in a preferred embodiment, are preferably formed so as to be identical and as such, they may be used in multiples in an end-to-end placement whereby the system can be utilized to build to a desired height. Means are provided for locking the vertically extending columnar members together as will be discussed hereinbelow.

The system includes at least one vertical columnar member and preferably a plurality of such members may be utilized. The vertical members perform the function of holding the shelves in the desired position and orientation and to this end, in a preferred embodiment, the shelves have apertures extending therethrough into which the vertical columnar members are adapted to slide and thereby support the shelves. The horizontally extending members are adapted to engage with the vertically extending members (or a member adjoined thereto such as the shelves) in a locking relationship as will be shown in greater detail hereinafter to thereby provide a solid secure structure.

The invention also provides for simplicity of assembly with many of the components being common throughout the assembly whereby no tools, adhesives or fasteners are required to assemble the unit. Similarly, the invention also provides that the unit can be easily removed from the compartment and dismantled without the use of tools or excessive force.

The shelving system can fit securely in various sized compartments. This is made possible by the placement of the horizontal members which are adjustable and compensate for the variance in width and depth of a compartment. By stacking several units together the shelving system can be securely installed to an unlimited height.

The invention also provides for flexibility in the placement of shelves anywhere within the storage compartment or at various positions along the vertical columnar members. In a preferred embodiment, the structure requires a minimum placement of a shelf at every joint between the end-to-end placement of vertical columnar members. The user may choose to place a shelf at midway points along a vertical columnar member. The 'L' shaped, flat type or other shelf configuration are interchangeable with each other.

With the addition of the angular member connecting to the protruding pin on the vertical columnar member, a user such as a school student, can store books in an upright fashion. This angular member acts as a bookend to hold the books and also provides additional structural support.

The invention also provides the ability to be assembled within the compartment should the door of the compartment be too small to accommodate the assembled structure. Also, depending on the arrangement of shelves in the assemtled unit, the 'L' shaped design of the shelves allows an assembled structure to be oriented so that it will pass through a narrow door and once into the compartment, reoriented to its proper position.

The invention also provides for the secure placement of shelving and for the secure joining of multiple units together. The secure placement of shelves is accomplished by providing a frictional wedge shape on the vertical columnar members at the point of contacting the inner walls of the apertures in the shelves. The apertures are designed to mate with the wedge shape. The multiple joining of units is accomplished by a keylock member. The keylock member provides a wedge shape as well as two other functions. It provides a pin stop for a shelf at the joints of the vertical columns and also has two slots or notches which mate with teeth in the vertical columnar member. At a joint, one slot mates with a tooth in the bottom end of a vertical columnar member and the other slot mates with a tooth at the top end of a vertical columnar member. With the aperture of a shelf in place the vertical columnar members cannot be pulled apart. At the very top of a unit the keylock sets completely into the end of the vertical columnar member thereby allowing the aperture of the shelf positioned at the top of the unit to fully receive the united keylock and vertical columnar unit.

Having thus generally described the invention, reference will be made to the accompanying drawings illustrating embodiments thereof, in which:

FIG. 5 is a sectional view taken along the lines 5—5 of FIG. 2;

FIG. 6 is a sectional view taken along the lines 6—6 of FIG. 13;

FIG. 7 is a detailed sectional view of one use of a keylock member;

FIG. 8 is a perspective view, partially in cutaway, of one of the vertical columnar members;

FIG. 9 is a perspective view of a keylock member;

FIG. 10 is a perspective view of a portion of a shelf employed in the shelving unit;

FIG. 11 is a sectional view along the lines 11—11 of FIG. 5;

FIG. 12 is a sectional view along the lines 12—12 of FIG. 13;

Figure 1:
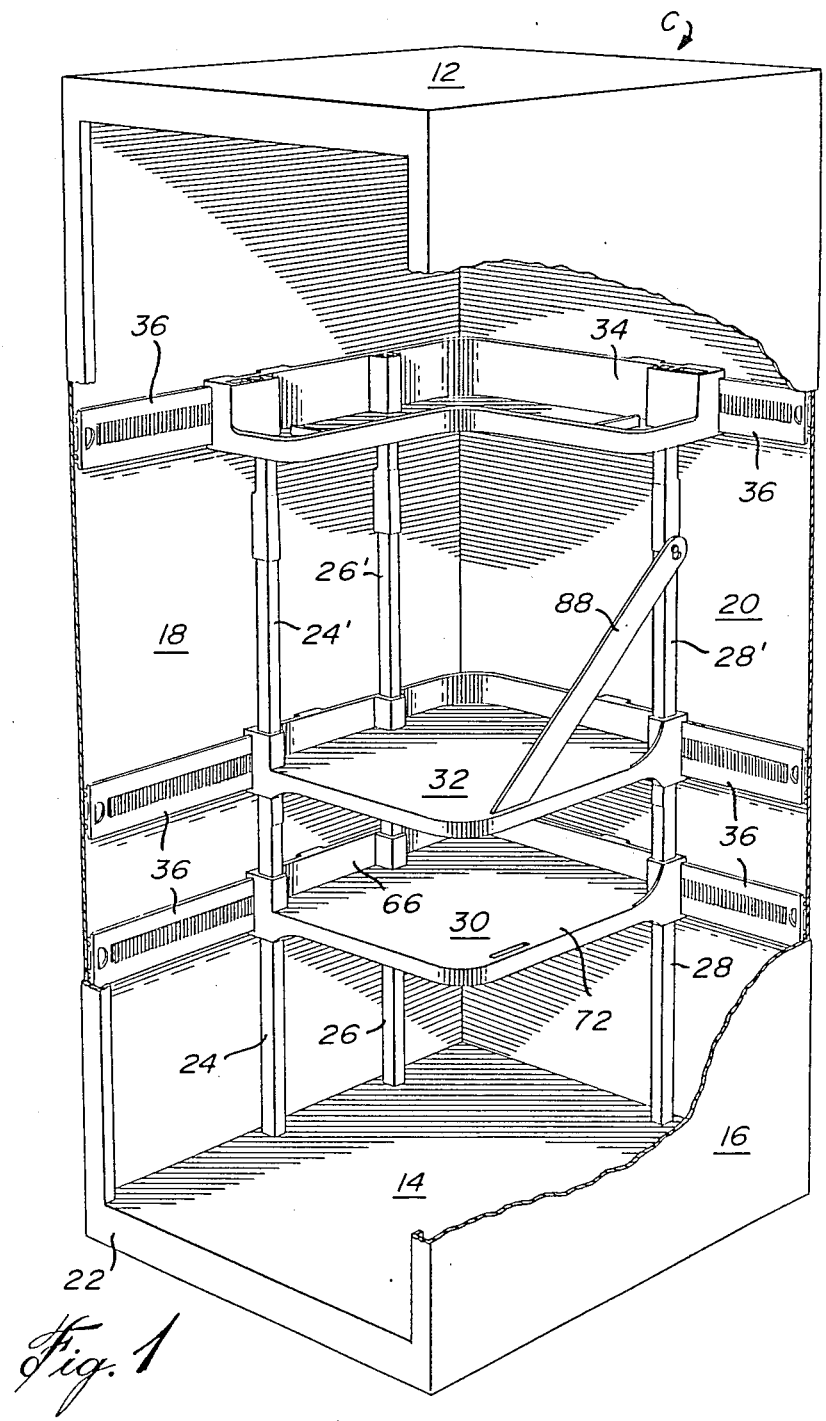
FIG. 1 is a perspective view of a shelving unit placed in a storage compartment.

Referring to the drawings in greater detail, and by reference characters thereto, the shelving unit or system of the present invention is adapted to be used in a compartment which is shown in partial cutaway in FIG. 1 and is generally designated by reference character C. Compartment C is of a generally rectangular configuration having a top wall 12, a bottom 14, a pair of opposed side walls 16, a back wall 20, and a front wall 22, a portion of which is shown. The balance of front wall 22 would normally comprise a door to the compartment C.

The shelving system as illustrated in FIG. 1, includes a plurality of vertical columnar members, three of such members being utilized in the embodiment of FIG. 1. In turn, each columnar member shown in FIG. 1 comprises a pair of identical members joined together—i.e. vertical members 24, 24'; 26, 26'; and 28, 28'. Supported by the vertical columnar members, in a manner to be discussed hereinbelow, are three shelves or storage places generally designated by reference numerals 30, 32 and 34. A plurality of horizontally extending members are utilized to provide support to the vertical columnar members, all the horizontally extending members being identical and generally designated by reference numeral 36.

As previously mentioned, each vertical columnar member (24, 24', 26, 26', 28, 28') is identical and reference will now be had to FIG. 8 illustrating vertical columnar member 24. Columnar member 24 has a front wall 38 and opposed side walls 40 and 42. A plurality of ribs 44 extend between side walls 40 and 42. For purposes of orientation relative to their use in the shelving system of the present invention, reference numeral 46 indicates the "top" of each vertical columnar member while 48 indicates the bottom portion thereof. It will be noted that in the central portion of vertical columnar member 24 there is provided a diverging portion generally indicated by reference numeral 50 wherein side walls 38, 40 and 42 taper outwardly to provide a wedge shaped configuration for reasons which will become apparent hereinafter. A stop member 52 is provided at the bottom of diverging portion 50. As may also be seen from FIG. 8, a pair of teeth 54 are provided on the back of front wall 38 at the top 46 while a further tooth 56 is provided at bottom 48.

The invention also utilizes a plurality of keylock members all of which are identical and one of which is shown in FIG. 9 and designated by reference numeral 58. Keylock member 58 has a first portion 60 which is of a generally rectangular configuration, but with a slight taper outwardly from the top portion to the bottom. Extending from the rear of portion 60 are a plurality of teeth 62; the portion 63 of one of the teeth 62 again has a slightly tapered configuration with the side walls tapering inwardly as they extend outwardly from portion 60. A stop member 64 extends from the opposite side of portion 60.

The shelving unit of the present invention is adapted to be utilized with a plurality of differently configurated shelves. However, each shelf is supported by the vertically extending columnar members and the structural support for such shelves is illustrated in FIG. 10 which shows a portion of shelf 30. Shelf 30 includes a side wall 66 upon which are mounted four L-shaped flanges 68. Flanges 68, as may be seen from FIG. 10, are arranged such that there are a pair on the upper marginal edge of side wall 66 and a pair on the lower marginal edge of wall 66. The arrangement of flanges 68 is such that they are offset with respect to each other. Flanges 68 thus define a guideway which is adapted to receive a horizontally extending member (to be discussed hereinbelow). A plurality of teeth 70 are provided for reasons which will be apparent hereinbelow. The shelf member also includes, in the portion illustrated in FIG. 10, a pair of apertures 76 and 78 extending therethrough with aperture 76 being adapted to receive vertically extending columnar member 24 and aperture 78 receiving columnar member 26. Each of the apertures is defined by walls which taper slightly outwardly from the top to the bottom portion of the aperture so that a mating fit is obtained when the columnar members are inserted.

Figure 4:
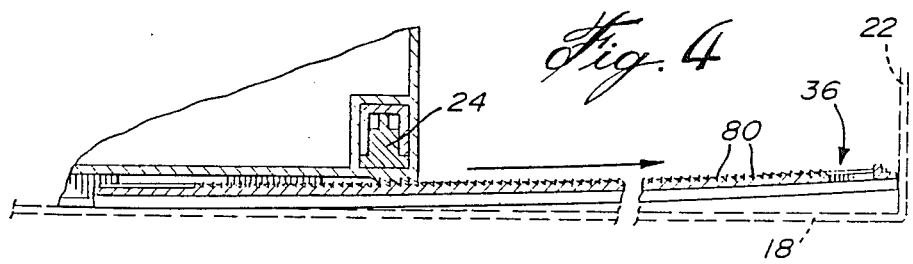
FIG. 4 is a sectional view taken along the lines 4—4 of FIG. 2.

Horizontally extending members 36 have an elongated rectangular form with a first surface thereof having a plurality of unidirectionally extending teeth 80 (FIG. 4). These teeth are adapted to engage teeth 70 on the side wall 66 of the shelves as will be discussed in greater detail hereinbelow.

Figure 2:
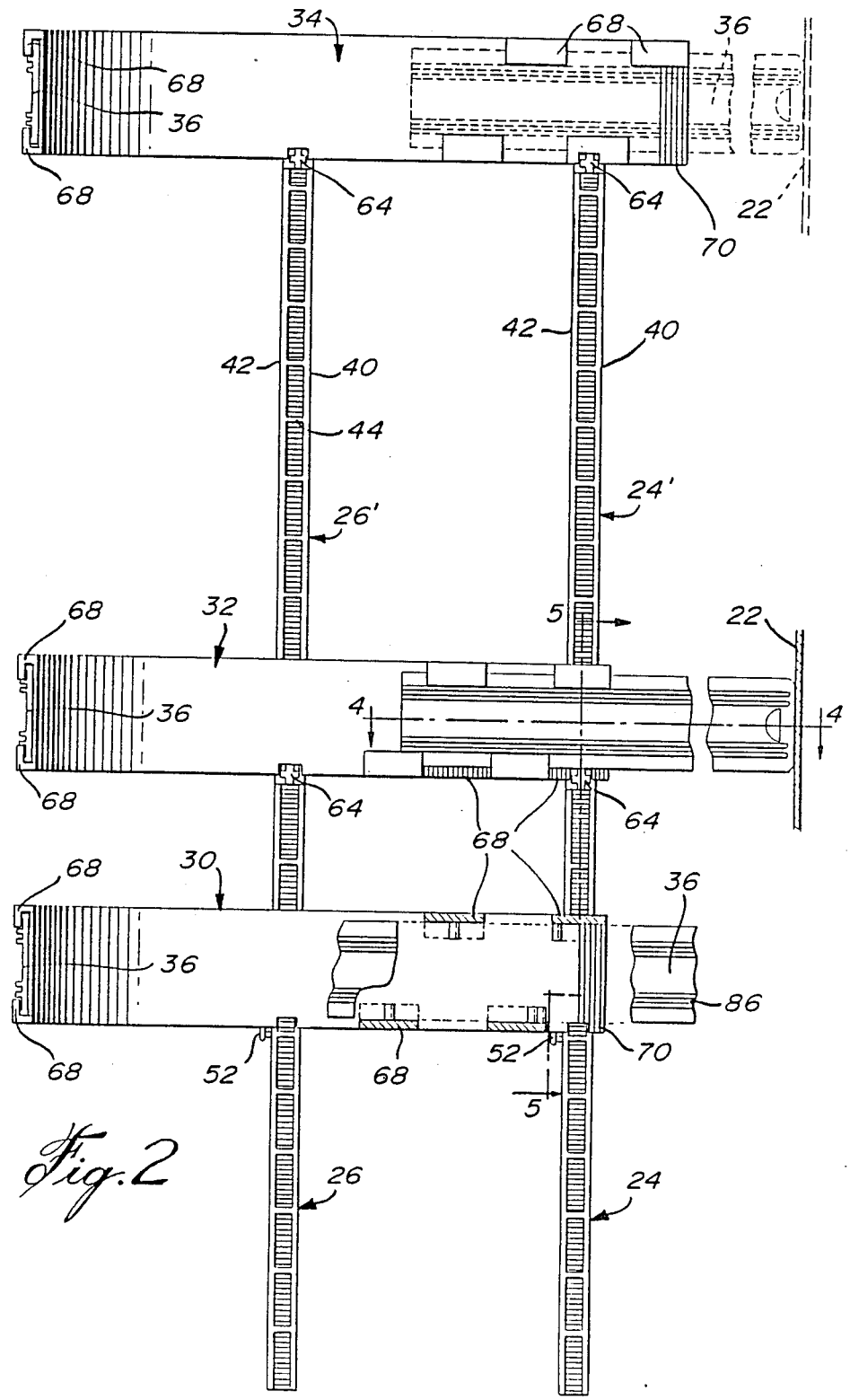
FIG. 2 is a rear elevational view of a portion of the shelving unit as seen from the left-hand side of FIG. 1.
Figure 3:
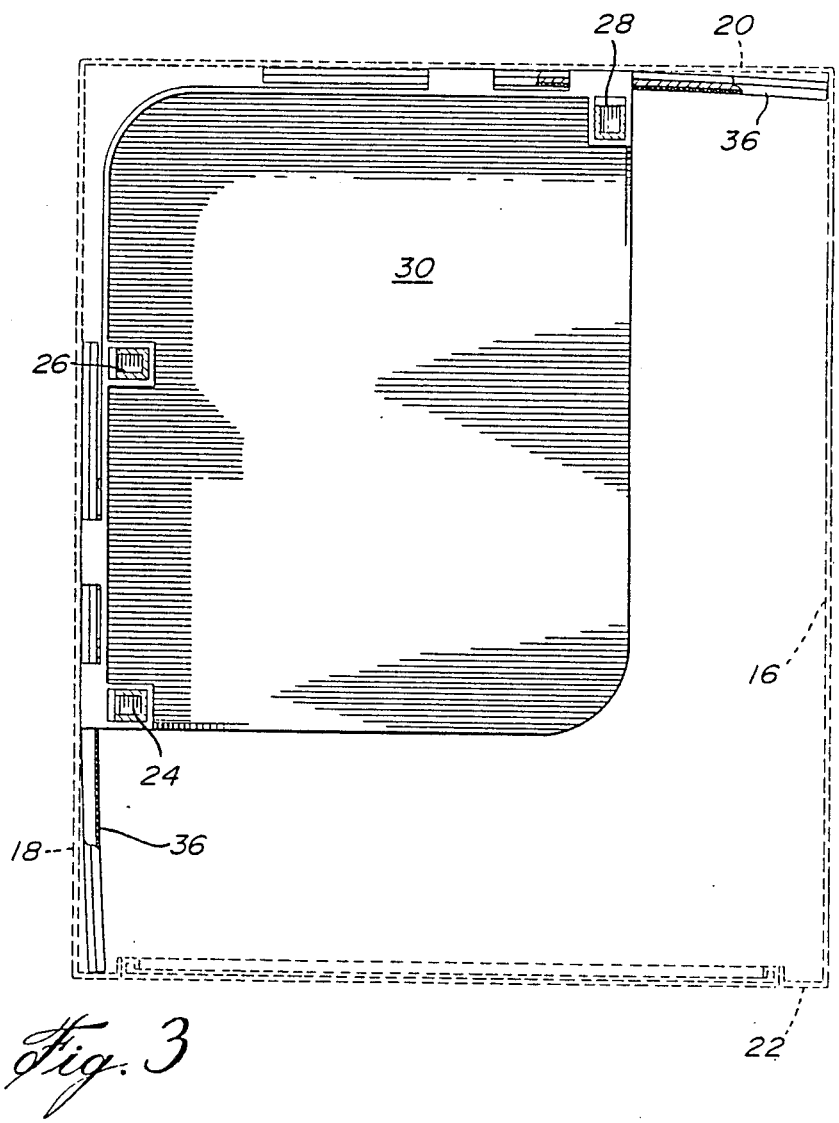
FIG. 3 is a top plan view showing one of the shelves of the assembled shelving unit.

During assembly of the shelving system of the present invention, a first shelf 30 has columnar members 24, 26 and 28 placed within their respective apertures (FIGS. 2 and 5). Shelf 30 is retained in position due to the diverging portion 50 and stop member 52 which function to retain the shelf in position. In other words, the wedge shaped diverging portion 50 will engage the interior surfaces of the walls defining the apertures to maintain a tight frictional engagement therewith and lock shelf 30 in position. As previously mentioned, the walls defining the aperture are themselves slightly tapered and a mating engagement between the diverging portion 50 and the walls defining the aperture results.

Shelf member 32 then has the lower portion of columnar members 24', 26' and 28' inserted down through their respective apertures. A keylock member 58 is inserted between the top 46 of each columnar member (24, 26 and 28) and the bottom of columnar members 24', 26' and 28'. Keylock 58 functions to join the columnar members together as shown in FIG. 5. In this respect, keylock member 58 and teeth 62 will mate with teeth 54 and 56 on the columnar members. In addition, and as may be best seen from FIG. 9, portion 63 of tooth 62 has a slightly taperedconfiguration such as to force walls 40 and 42 slightly apart to again create a wedge type effect. Following the locking of the columnar members together, shelf 32 is lowered into position as may be seen in FIG. 5.

Subsequently, as shown in FIG. 7, a keylock member is placed into the uppermost portions of columnar members 24', 26' and 28'. Again, portion 63, in conjunction with the overall tapered configuration of keylock member 58, will function to provide a frictional fit for top shelf 34.

Following assembly of the shelf members, horizontally extending members 36 may be inserted. The assembled unit is then placed in position as shown in FIG. 1 and horizontally extending members are slid outwardly so that one end thereof abuts against adjacent walls. The locking of teeth 80 on members 36 with the teeth 70 located on the side walls of the shelves ensures that horizontal movement of the assembly cannot occur. It should be noted that horizontally extending member 36 is provided with ribs 86 on the side opposite the side containing the teeth, ribs 86 extending along the longitudinal direction. Member 36 is designed to flex along its lateral axis so that a force may be applied to unlock the teeth and allow movement when it is desired to remove or adjust the shelving unit.

Figure 13:
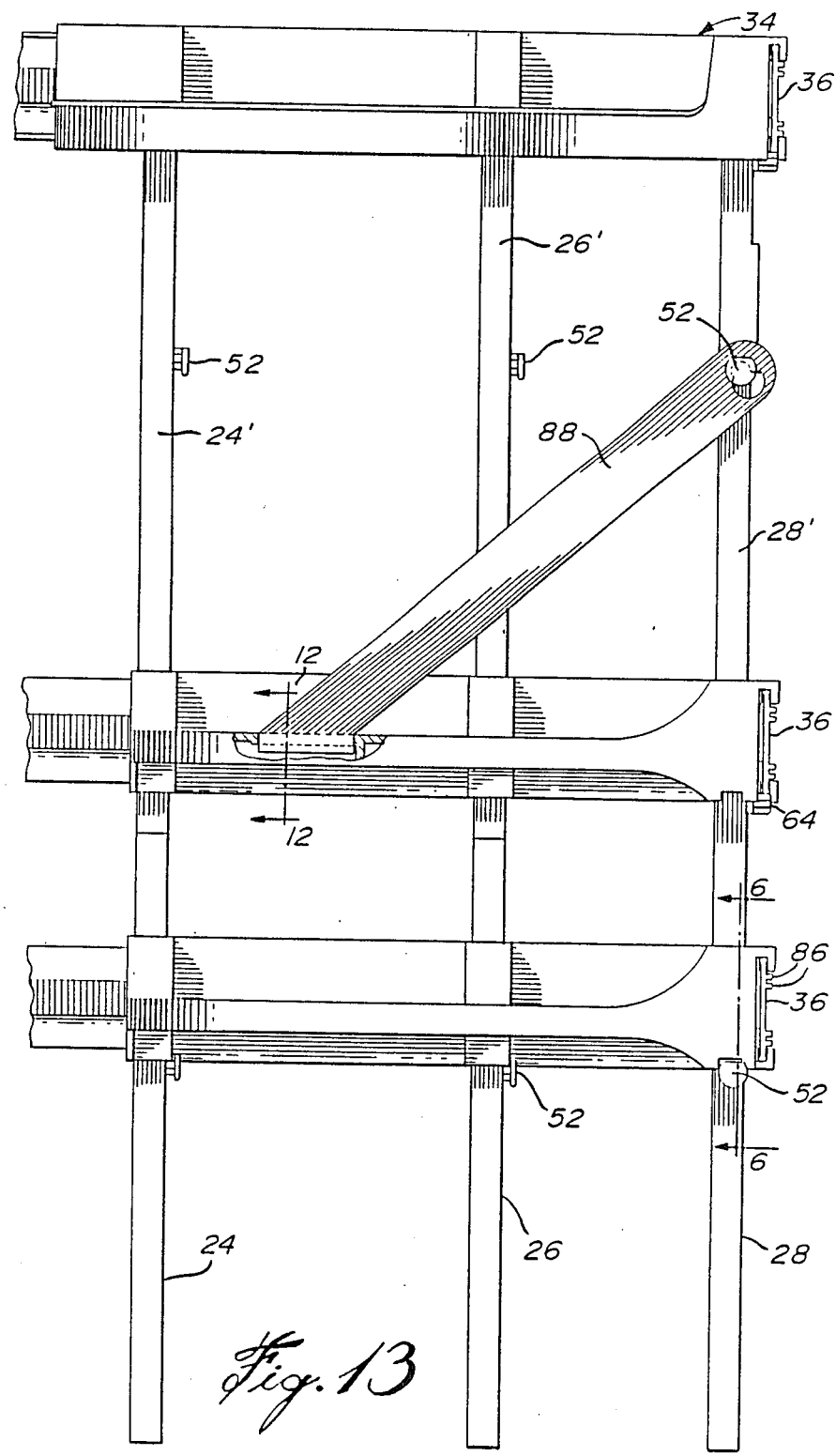
FIG. 13 is a side elevational view of the shelving system of FIG. 1.

If desired, and as shown in FIGS. 1 and 13, a supporting member 88 acts as a bookend and may be utilized to support one or more shelves if such shelves are expected to retain heavy loads.

Figure 14:
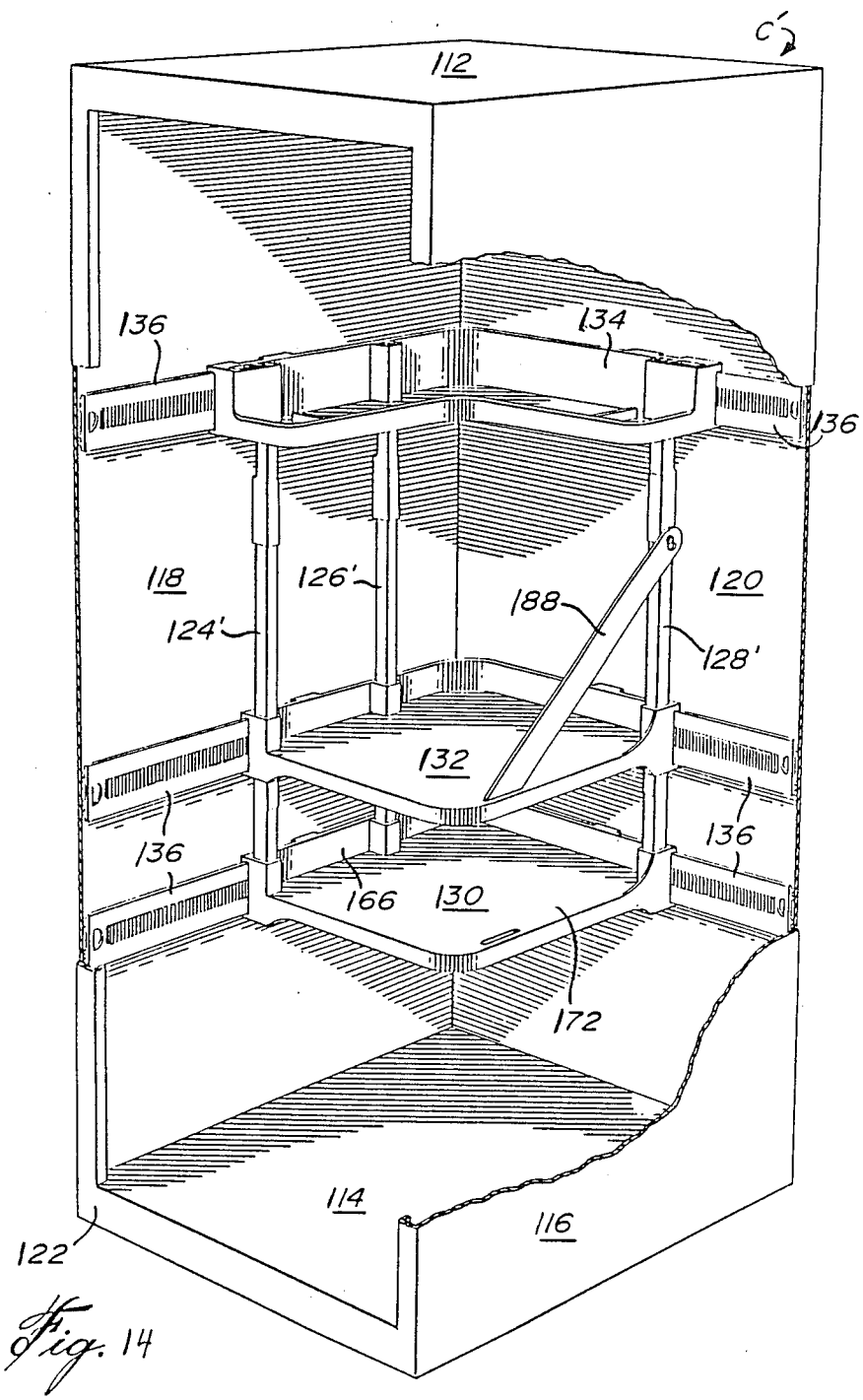
FIG. 14 is a perspective view similar to FIG. 1 of a further embodiment of a shelving unit according to the present invention.

Referring to FIG. 14, there is shown a further compartment C' having a top wall 112, a bottom 114, a pair of opposed side walls 116, back wall 120 and a front wall 122. In this embodiment, the shelving system is similar to that illustrated in FIG. 1 and similar reference numerals in the 100's are employed for like components. However, in this embodiment, vertical columnar members are not utilized for vertical support in the manner illustrated in FIG. 1. There are illustrated columnar members 124', 126', 128' which may, if desired, be utilized to distribute any load among the horizontally extending members 136. However, it will be appreciated that even these portions of the vertically extending members may be eliminated if so desired.

Since common components are utilized, the shelves may be arranged in many different manners. Thus, one may utilize rectangular shelves, L-shaped shelves, etc. depending on the desired use of the shelving system. The system is preferably formed by injection molding of a suitable hard plastics material, many of which are known to those knowledgeable in the art.

The number of vertical columnar members, like the number of shelves, may be varied depending upon the requirements of the system. Thus, in some instances, no columnar members may be necessary or as few as one columnar member may be sufficient. Similarly, the arrangement of the horizontally extending members may be modified as will be understood by those knowledgeable in the art. The particular arrangement of the teeth or other mechanism to retain the horizontal member in place may be placed on, if desired, the columnar member itself.

It will be understood that other changes and modifications may be made to the invention without departing from the spirit and scope thereof.

I claim:

1. A shelving system suitable for use in the corner of a locker wherein the locker has a generally rectangular configuration with a back wall, a pair of parallel side walls and a front wall having means for gaining access to the locker, the system comprising a vertical columnar member extending upwardly from a base of the storage compartment along a wall thereof, at least a pair of storage shelves, each of said storage shelves being engaged by and vertically supported by said vertical columnar member, a pair of horizontally extending members associated with a least one of said storage shelves, a first one of said pair of horizontally extending members extending along a side wall with a first end thereof being in abutting relationship with the front wall and a portion adjacent the opposed end being in a locking relationship with a vertical member or shelf, a second one of said pair of horizontally extending members extending along the back wall with a first end thereof abutting a side wall and a portion at the second end being in a locking relationship with a vertical member or shelf, each of said horizontally extending members being in a state of compression to thereby provide a horizontal stability to the vertical member and shelf supported thereby.

2. The system of claim 1 wherein each of said shelves has an aperture extending therethrough to receive said vertical columnar member having a stop associated therewith to secure the shelf in a desired position.

3. The system of claim 2 wherein said vertical columnar member has a portion thereof forming a wedge shaped configuration, said wedge shaped configuration entering into a locking relationship with the shelf when passing through said aperture.

4. The system of claim 2 wherein said stop is formed integrally with said vertical columnar member.

5. The system of claim 1 wherein said verticaly columnar member comprises a plurality of vertical elements aligned to an end-to-end relationship, means for securing said vertical elements together, said means comprising a keylock member having a stop means associated therewith for supporting a shelf, said keylock member engaging with said vertical elements.

6. The system of claim 1 wherein the portion of each of said horizontally extending members in a locking relationship are formed with unidirectional teeth thereon adapted to engage teeth on said vertical members or shelves whereby said horizontal members are adjustable outwardly from the vertical members or shelves to enter into a bracing relationship against an adjacent wall.

7. The system of claim 1 including a plurality of vertically extending columnar members, each of said verticallly extending columnar members being adjacent a side or back wall to provide easy access to the shelves, each of said shelves having apertures formed therein to receive said vertical columnar members, each of said vertical columnar members having stops associated therewith to secure the shelf in the desired position.

* * * * *